United States Patent [19]

Holka

[11] Patent Number: 5,262,693
[45] Date of Patent: Nov. 16, 1993

[54] ELECTRICAL GENERATOR HAVING COUNTER ROTATIONAL FIELDS

[75] Inventor: Thomas C. Holka, Milford, Mich.

[73] Assignee: Ford Motor Company, Dearborn, Mich.

[21] Appl. No.: 896,769

[22] Filed: Jun. 10, 1992

[51] Int. Cl.[5] ............... H02K 23/60; H02K 7/06; H02K 4/27
[52] U.S. Cl. ................. 310/121; 310/83; 310/181; 310/266; 475/12
[58] Field of Search ............ 310/80, 83, 91, 99, 310/262, 266, 267, 121, 111, 113, 114, 126, 181; 475/9, 12, 268, 336

[56] References Cited

U.S. PATENT DOCUMENTS

| | | | |
|---|---|---|---|
| 3,215,877 | 11/1965 | Raver et al. | 310/168 |
| 3,296,451 | 1/1967 | Van Ausdal et al. | 290/4 |
| 3,496,447 | 2/1970 | Thompson | 322/23 |
| 3,950,950 | 4/1976 | Doerner et al. | 60/657 |
| 3,974,396 | 8/1976 | Schonball | 290/54 |
| 4,021,690 | 5/1977 | Burton | 310/67 R |
| 4,032,807 | 6/1977 | Richter | 310/178 |
| 4,056,746 | 11/1977 | Burtis | 310/115 |
| 4,061,121 | 12/1977 | MacLeod | 123/149 |
| 4,061,926 | 12/1977 | Peed | 290/55 |
| 4,147,945 | 4/1979 | Holz et al. | 310/115 |
| 4,160,435 | 7/1979 | Sleder | 123/148 |
| 4,211,945 | 7/1980 | Tawse | 310/112 |
| 4,254,843 | 3/1981 | Han et al. | 180/165 |
| 4,358,727 | 11/1982 | Campen | 322/90 |
| 4,387,781 | 6/1983 | Ezell et al. | 180/65 |
| 4,404,513 | 9/1983 | Campen | 322/90 |
| 4,439,720 | 3/1984 | Georges | 322/4 |
| 4,649,307 | 3/1987 | Bech | 310/99 |
| 4,691,119 | 9/1987 | McCabria | 307/84 |
| 4,817,461 | 4/1989 | Iseman | 74/720 |
| 4,862,009 | 8/1989 | King | 290/22 |
| 4,965,477 | 10/1990 | Stadler et al. | 310/114 |
| 4,990,807 | 2/1991 | Flygare et al. | 310/68 |
| 5,089,734 | 2/1992 | Bickris | 310/83 |

Primary Examiner—Steven L. Stephan
Assistant Examiner—D. R. Haszko
Attorney, Agent, or Firm—Roger L. May; Paul K. Godwin, Jr.

[57] ABSTRACT

An electrical generator (10) having particular utility as a vehicle alternating generator includes a planetary gear set (32) for providing counter rotation of a pair of fields (80,82) with respect to a coil (60) so as to provide high power output even at relatively low speeds of driving without providing excessive rotational speed at high speeds of driving. In one embodiment, the planetary gear set (32) includes a ring gear (36), a sun gear (44), and a planet carrier (50) whose planet gears (52) rotate about associated axes parallel to the rotational axis A about which the planetary gear set operates. In another embodiment, the planetary gear set has a bevel gear construction including first and second bevel gears (36',44') rotatable about the rotational axis of the planetary gear set and meshed with bevel type planet gears (52') of the planet carrier (50') so that the two field (80',82') have counter rotation with respect to each other at the same rotational speed. Both embodiments of the generator (10,10') have a stationary planet carrier (50,50') so that the other gears meshed with the planet gears (52,52') thereof rotate about the rotational axis A to provide the counter rotation of the fields (80,80' and 82,82') with respect to the coil (60,60').

8 Claims, 2 Drawing Sheets

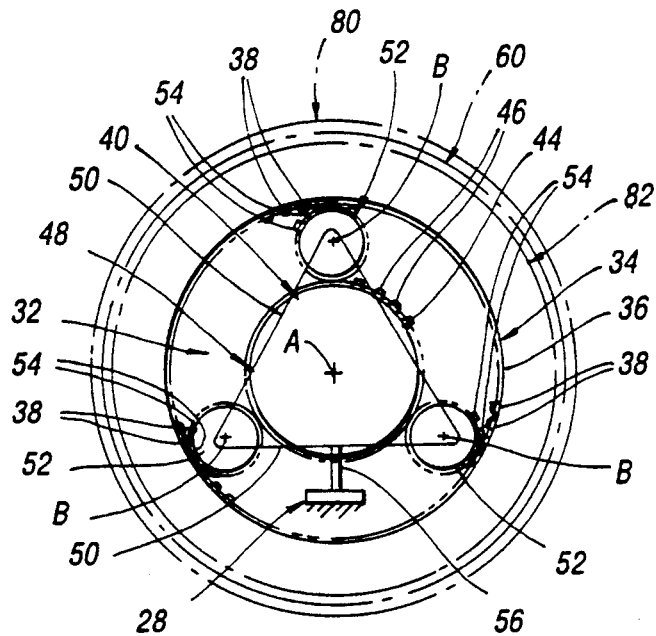
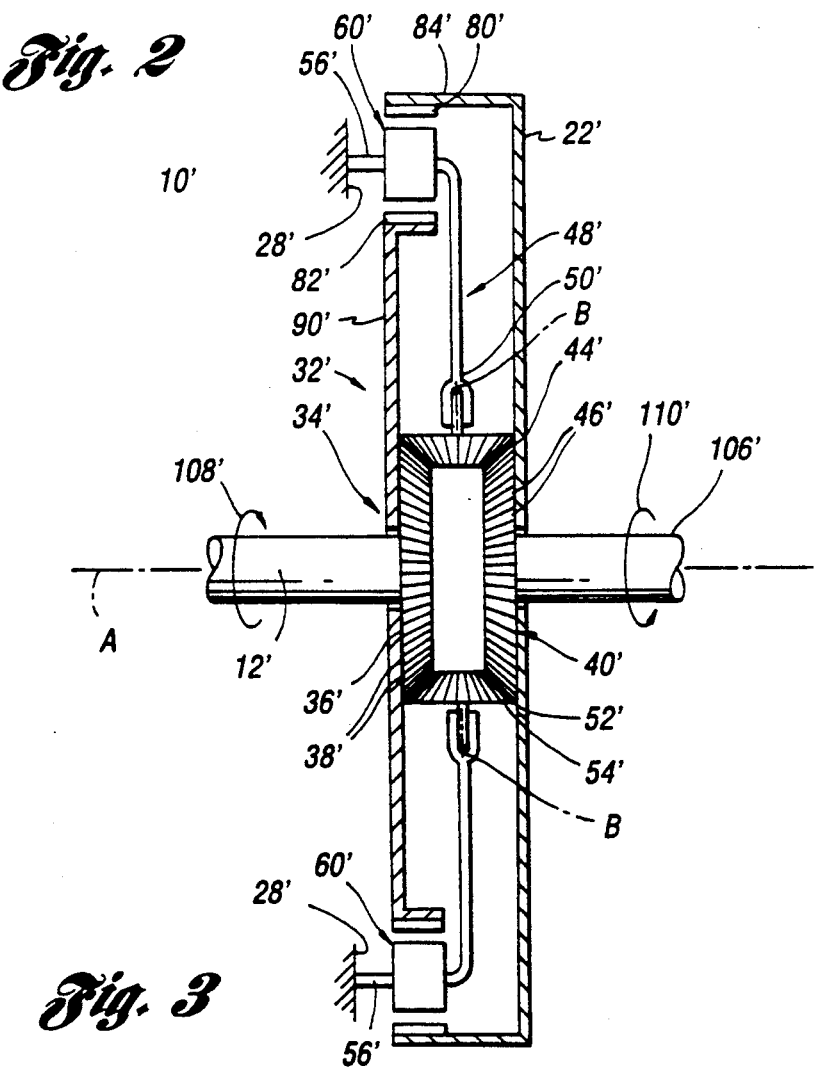

ELECTRICAL GENERATOR HAVING COUNTER ROTATIONAL FIELDS

TECHNICAL FIELD

This invention relates to an electrical generator that is capable of generating high power output at relatively low speeds.

BACKGROUND ART

Electrical generators generate electrical power to a greater extent at increasing speeds. Thus, vehicle alternating electrical generators or alternators do not generate anywhere near as much power at engine idle speed as at normal driving speeds. Use of a gear unit to increase the rotor speed of a conventional generator in order to generate more power at engine idle speed also provides a proportional increase in the rotor speed at normal driving speeds and can produce vibration and other problems.

One use for which it is particularly desirable to have an electrical generator that provides high output at low speeds is for a hermetically sealed vehicle air conditioning system wherein the input is electrical power as opposed to a belt and pulley driven compressor in accordance with conventional vehicle air conditioning systems. Electrically heated windshields are another use for which it is particularly desirable to have an electrical generator that provides high output at low speeds.

DISCLOSURE OF INVENTION

An object of the present invention is to provide an improved electrical generator capable of generating a relatively high electrical power output even at low driving speeds by the use of a planetary gear set that drives a pair of fields for counter rotation with respect to a stationary coil.

In carrying out the above and other objects of the invention, an electrical generator constructed in accordance with the invention includes a support and a planetary gear set mounted by the support for rotational operation about a rotational axis. The planetary gear set has a first component including a first gear having teeth spaced about the rotational axis, a second component including a second gear having teeth spaced about the rotational axis, and a third component including a planet carrier having planet gears spaced about the rotational axis and mounted thereon for rotation about associated axes in a meshing relationship with both the first gear and the second gear. One of the components of the planetary gear set has a fixed connection to the support and the other two components are rotatably supported about the rotational axis such that rotational driving of one of the other two components in one direction about the rotational axis provides rotational driving of the remaining component in the opposite direction about the rotational axis. A coil of the generator is fixed with respect to the support, and a pair of fields of the generator are respectively driven by the other two components of the planetary gear set for rotation in opposite directions with respect to the coil to provide high power electrical generation in the coil even at relatively low speeds of rotational driving of the one component of the planetary gear set.

In both of two preferred embodiments disclosed, the third component including the planet carrier and planet gears rotatably mounted thereon is the one component of the planetary gear set that has the fixed connection to the support. Both of the preferred embodiments of the electrical generator also have the coil provided with a generally annular shape, and the pair of fields are constructed with relatively large and small sizes and respectively located radially outward and inward with respect to the annular coil.

In one preferred embodiment, the electrical generator has the first gear constructed as a ring gear having internal teeth and has the second gear constructed as a sun gear having external teeth. Furthermore, the planet gears of the planet carrier of this embodiment are located radially between and in a meshing relationship with both the ring gear and the sun gear and are rotatable about associated axes that extend parallel to the rotational axes of the planetary gear set.

In another preferred embodiment, the electrical generator has the first gear constructed as a first bevel gear having bevel teeth that are inclined with respect to the rotational axis of the planetary gear set and has the second gear constructed as a second bevel gear spaced axially along the rotational axis from the first bevel gear and having bevel teeth that are inclined with respect to the rotational axis of the planetary gear set. This embodiment also has the planet gears of the planet carrier constructed as bevel gears that rotate about associated axes extending radially to the rotational axis of the planetary gear set and that each have bevel teeth meshed with the bevel teeth of the first and second bevel gears.

Each of the preferred embodiments has the third component including the planet carrier and planet gears rotatably mounted thereon provided as the one component of the planetary gear set that has the fixed connection to the support as well as having the coil provided with an annular shape and the pair of fields having relatively large and small sizes respectively located radially outward and inward with respect to the annular coil.

Both embodiments of the electrical generator are constructed as vehicle alternating generators or alternators and have particular utility for providing relatively high power output even at low speeds such as engine idling.

The objects, features and advantages of the present invention are readily apparent from the following detailed description of the best modes for carrying out the invention when taken in connection with the accompanying drawings.

BRIEF DESCRIPTION OF DRAWINGS

FIG. 2 is a schematic view taken along the direction of line 2—2 of FIG. 1; and

FIG. 3 is a view similar to FIG. 1 of another preferred embodiment of the generator.

BEST MODES FOR CARRYING OUT THE INVENTION

Figure 1:
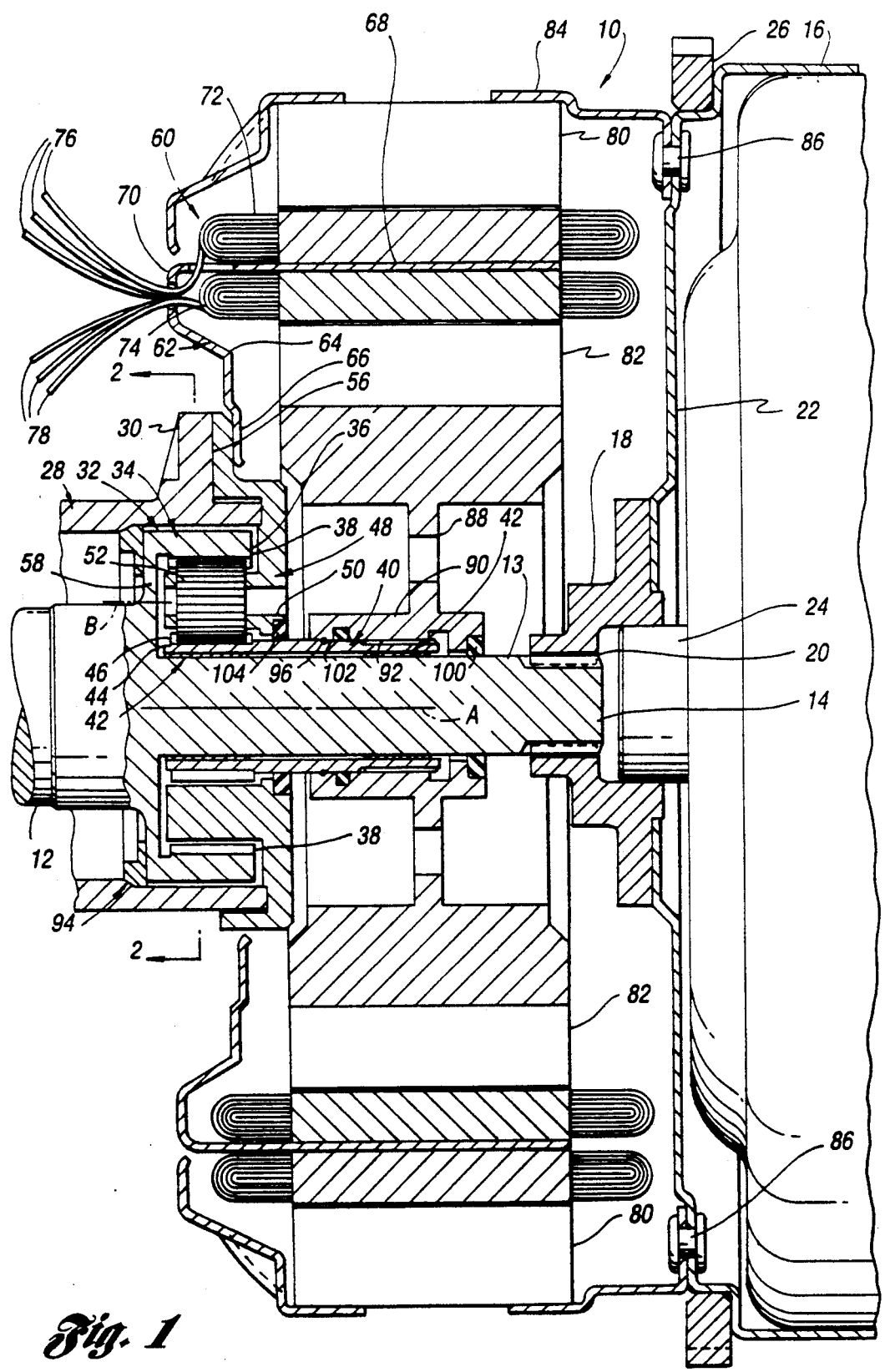
FIG. 1 is a longitudinal sectional view taken through one preferred embodiment of an electrical generator.

With reference to FIG. 1 of the drawings, an electrical generator constructed in accordance with the present invention is indicated generally by 10 and is illustrated as a vehicle alternating generator or alternator as is hereinafter more fully described. In the specific construction shown, the vehicle alternating generator shown is driven by an engine output drive shaft 12 having a reduced diameter portion 13 with a distal end 14 that drives a torque converter 16 by a coupling 18 through a spline connection 20. The coupling 18 is fixed in a suitable manner to a flywheel wall 22 and is also rotatably supported by a stub shaft 24 of the torque converter. On its outer extremities, the wall 22 supports an annular drive gear 26.

With continuing reference to FIG. 1 and additional reference to FIG. 2, the electrical generator 10 includes a support 28 which is embodied by a somewhat tubular member that has a plurality of circumferentially spaced mounting flanges 30 (FIG. 1) only one of which is shown. A planetary gear set 32 of the generator is mounted by the support 28 for rotational operation about a rotational axis A about which the drive shaft 12 also rotates. This planetary gear set includes a first component 34 having a first gear 36 including teeth 38 spaced about the rotational axis A. A second component 40 of the planetary gear set is constructed as a sleeve that is supported by needle bearings 42 on the reduced diameter portion 13 of the drive shaft 12. This second component 42 has a second gear 44 having teeth 46 spaced about the rotational axis A. A third component 48 of the planetary gear set includes a planet carrier 50 having planet gears 52 spaced about the rotational axis A and mounted thereon for rotation about associated axes B and having teeth 54 that are engaged in a meshing relationship with the teeth of both the first gear 36 and the second gear 44.

One of the components of the planetary gear set 32 illustrated in FIG. 1, which is the third component 48 including planet carrier 50 as illustrated, has a fixed connection 56 to the support 28 and may be provided in any suitable manner such as by fastener securement to the circumferentially spaced flanges 30. The other two components, which as illustrated are the first and second components 34 and 40, are rotatably supported about the rotational axis A. The first component 34 has a connection 58 to the drive shaft 12 such that the driving of this component in one direction about the rotational axis A provides rotational driving of the second component 44 in the opposite direction about the rotational axis A due to the operation of the planetary gear set.

Generator 10 also includes a coil 60 fixedly mounted with respect to the support 28 by an annular member 62 having a radially extending wall 64 with an inner annular extremity 66 mounted on the support 28 at the circumferentially spaced flanges 30 thereof along with the third component 48 which includes the planet carrier 50. An axially extending annular wall 68 extends from the outer annular extremity 70 of the radially extending wall 64 to provide the fixed support for the coil 60. As illustrated, this coil 60 has a pair of outer and inner windings 72 and 74 mounted on the exterior and interior, respectively of the stationary axially extending wall 68. Winding 72 has three connector wires 76 while winding 74 has three connector wires 78.

With continuing reference to FIG. 1, generator 10 includes a pair of fields 80 and 82 which can be permanent magnets or wound fields through which current is supplied by brushes which are not shown. The one field 80 is supported by an annular member 84 which is secured in any suitable manner such as by rivets 86 to the wall 22 that is driven through coupling 18 by the splined distal end 14 of drive shaft 12 so as to thus be driven by the first component 34 of the planetary gear set. The other field 82 has a connecting wall 88 that extends inwardly to an annular drive connector 90 that has a splined connection 92 to the opposite end of the second component 40 at which the second gear 44 is located. The planetary gear set 32 thus drives the pair of fields 80 and 82 in opposite directions about rotational axis A and thereby provides high power electrical generation in the coil 60 even at relatively low speeds of rotational driving of the first component that is directly driven by the engine drive shaft 12. Thus, the generator can provide high power electrical generation even at engine idling conditions.

It should be noted that the fields 80 and 82 that are driven for counter rotation with respect to the coil 60 must rotate in an integer relationship of speed with respect to each other. More specifically, in the embodiment illustrated in FIGS. 1 and 2, the diameter of the pitch circle of the teeth 38 of the first gear 36 is twice the diameter of the pitch circle of the teeth 46 of the second gear 44 so that the meshing of these two gears with the planet gears 52 provides driving of the second gear 44 at two times the speed of the first gear 34. More specifically, this driving takes place as previously mentioned with the third component 48 including the planet carrier 50 and planet gears 52 mounted thereon as the component of the planetary gear set that has the fixed connection 56 to the support.

As schematically illustrated in FIG. 2, the coil 60 has an annular shape and the pair of fields 80 and 82 have relatively large and small sizes and are respectively located radially outward and inward with respect to the annular coil.

The embodiment of the electrical generator 10 illustrated in FIGS. 1 and 2 as generally discussed above has the first gear 36 constructed as a ring gear having internal teeth 38 and has the second gear 44 constructed as a sun gear having external teeth 46. Furthermore, the planet carrier 50 is fixed by the connection 56 to the support 28 and the planet gears 52 of the planet carrier are located radially between and in a meshing relationship with both the ring gear 36 and the sun gear 44, and these planet gears 52 are rotatable about associated axes B that extend parallel to the rotational axis A of the planetary gear set.

With specific reference to FIG. 1, the generator 10 illustrated has a fastening clip 94 received within the tubular shape of the support 28 to axially fix the planetary gear set 32 with respect to the rotational axis A by engagement of skewed surfaces as shown. This clip 34 preferably has a generally split ring shape with ends that can be moved toward each other during assembly prior to release and movement to the assembled position illustrated. Furthermore, the generator also includes a split ring type positioner 96 that axially fixes the sun gear 44 with respect to the drive connector 90 coupled to the magnetic field 82. A first annular seal 100 extends between this connector 90 and the reduced diameter portion 13 of the drive shaft 12 while a second annular seal 102 extends between the connector 90 and the outer surface of the component 40 whose one end includes the sun gear 44. Likewise, a further annular seal 104 extends between the second component 40 and the third component 48 including the planet carrier 50 on the opposite axial side of the planet gears 52 from the clip 94 that maintains the assembled relationship.

With reference to FIG. 3, another embodiment of the electrical generator also has particular utility as a vehicle alternating generator or alternator and is generally similar to the previously described embodiment and has like primed reference numerals applied to like components thereof such that much of the prior description is applicable and need not be repeated. As it is hereinafter more fully described, the planetary gear set 32' of the electrical generator 10' is of the bevel gear type instead of being of the ring and sun gear type as with the previously described embodiment. This bevel construction of the planetary gear set 32' allows the fields 80' and 82' to rotate in opposite directions at the same rotational speed as opposed to integer multiples as is the case with ring and sun gear type planetary gear sets.

With continuing reference to FIG. 3, the drive shaft 12' of the planetary gear set 32' is rotatively coupled to the first component 34' which includes a first bevel gear 36' having bevel teeth 38' that are inclined with respect to the rotational axis A of the planetary gear set. Furthermore, the second component 40' includes a second bevel gear 44' spaced axially along the rotational axis A from the first bevel gear 36' and having bevel teeth 46' that are inclined with respect to the rotational axis of the planetary gear set. The third component 48' of the planetary gear set 32' is a planet carrier 50' whose planet gears are bevel gears 52' that rotate about associated axes B extending radially to the rotational axis A of the planetary gear set. Each of the bevel type planet gears 52' has teeth 54' that are meshed with the bevel teeth 38' and 46' of the first and second bevel gears 36' and 44', respectively. This planet carrier 50' is also fixed with respect to the coil 60' whose connection 56' to the support 28' provides a stationary relationship thereof about the rotational axis A in a manner similar to the previously described embodiment. Furthermore, the wall 22' supports the member 84' on which the one field 80' is located radially outward from the coil 60' and rotatably movable with the one component 40' including the bevel gear 44'. Likewise, the connector 90' supports the other field 82' radially inward from the coil 60' for rotation with the component 34' including the bevel gear 36'. The bevel type planetary gear set 32' through this construction upon rotation of the shaft 12' in the one direction shown by arrow 108' rotates the other shaft 106' in the opposite direction such that the fields 80' and 82' are rotated in opposite directions with respect to each other on opposite sides of the coil 60' in a counter rotational manner. As previously mentioned, this counter rotation of the two fields 80' and 82' is at the same rotational speed about the rotational axis A of the planetary gear set 32' as opposed to having one field rotate at an integer multiple speed of the other.

As is apparent from the preceding description, both the embodiment of the generator 10 shown in FIGS. 1 and 2 and the embodiment of the generator 10' shown in FIG. 3 have the component 48,48' including the planet carrier 50,50' and the planet gears 52,52' rotatably mounted thereon as the component which has the fixed connection 56,56' to the support 28,28'. Furthermore, both embodiments have the coil 60,60' provided with an annular shape and the pair of fields 80,82' having relatively large and small sizes and respectively located radially outward and inward with respect to the annular coil. Both of these generators 10,10' are constructed as vehicle alternating generators which is a usage for which the invention has particular utility in order to provide high power output even at relatively low speeds of input driving such as an engine idle condition as previously described.

While the best modes for carrying out the invention have been described in detail, those familiar with the art to which this invention relate will recognize various alternative designs and embodiments for carrying out the invention as described by the following claims.

I claim:

1. An electrical generator, comprising: a support; a planetary gear set mounted by the support for rotational operation about a rotational axis and having a first component including a first gear having teeth spaced about the rotational axis, a second component including a second gear having teeth spaced about the rotational axis, and a third component including a planet carrier having planet gears spaced about the rotational axis and mounted thereon for rotation about associated axes and having teeth engaged in a meshing relationship with both the teeth of the first gear and the teeth of the second gear; one of the components of the planetary gear set having a fixed connection to the support and the other two components being rotatably supported about the rotational axis such that rotational driving of one of the other two components in one direction about the rotational axis provides rotational driving of the remaining component in the opposite direction about the rotational axis; a coil fixed with respect to the support; and a pair of field respectively driven by said other two components of the planetary gear set for rotation in opposite directions with respect to the coil to provide electrical power generation in the coil upon rotational driving of said one component of the planetary gear set.

2. An electrical generator as in claim 1 wherein the third component including the planet carrier and planet gears rotatably mounted thereon is the one component of the planetary gear set that has the fixed connection to the support.

3. An electrical generator as in claim 1 wherein the coil has an annular shape, and the pair of fields having relatively large and small sizes and being respectively located radially outward and inward with respect to the annular coil.

4. An electrical generator as in claim 1 wherein: the first gear is a ring gear having internal teeth, the second gear is a sun gear having external teeth, and the planet carrier being fixed by the connection to the support and the planet gears of the planet carrier being located radially between and with the teeth thereof in a meshing relationship with both the internal teeth of the ring gear and the external teeth of the sun gear and being rotatable about associated axes that extend parallel to the rotational axis of the planetary gear set.

5. An electrical generator as in claim 1 wherein: the first gear is a first bevel gear having bevel teeth that are inclined with respect to the rotational axis of the planetary gear set, the second gear is a second bevel gear spaced axially along the rotational axis from first bevel gear and having bevel teeth that are inclined with respect to the rotational axis of the planetary gear set, and the planet gears of the planet carrier are bevel gears that rotate about associated axes extending radially to the rotational axis of the planetary gear set and that each have bevel teeth meshed with the bevel teeth of the first bevel gear and with the bevel teeth of the second bevel gear.

6. An electrical generator as in claim 1 wherein the third component including the planet carrier and planet gears rotatably mounted thereon is the one component of the planetary gear set that has the fixed connection to the support, the coil having an annular shape, and the pair of fields having relatively large and small sizes and being respectively located radially outward and inward with respect to the annular coil.

7. A vehicle alternating generator, comprising: a support; a planetary gear set mounted by the support for rotational operation about a rotational axis and having a first component including a ring gear rotatable about the rotational axis, a second component including a sun gear rotatable about the rotational axis, and a third component including a planet carrier having planet gears spaced about the rotational axis and mounted thereon for rotation about associated axes in a meshing relationship with both the teeth of the first gear and the teeth of the second gear; the planet carrier of the third component of the planetary gear set having a fixed connection to the support such that rotational driving of one of the first and second components in one direction about the rotational axis provides rotational driving of the remaining component in the opposite direction about the rotational axis; an annular coil fixed with respect to the support; and a pair of fields having relatively large and small sizes and respectively located radially outward and inward with respect to the annular coil and respectively driven by said other two components of the planetary gear set for rotation in opposite directions with respect to the coil to provide electrical power generation in the coil upon rotational driving of said one component of the planetary gear set.

8. A vehicle alternating generator, comprising: a support; a planetary gear set mounted by the support for rotational operation about a rotational axis and having a first component including a first bevel gear rotatable about the rotational axis and having teeth, a second component including a second bevel gear rotatable about the rotational axis and having teeth, a third component including a planet carrier having planet gears of a bevel construction spaced about the rotational axis and mounted thereon for rotation about associated axes, and each planet gear having teeth in a meshing relationship with both the teeth of the first bevel gear and the teeth of the second bevel gear; the planet carrier of the third component of the planetary gear set having a fixed connection to the support such that rotational driving of one of the first and second components in one direction about the rotational axis provides rotational driving of the remaining component in the opposite direction about the rotational axis; an annular coil fixed with respect to the support; and a pair of fields having relatively large and small sizes and respectively located radially outward and inward with respect to the annular coil and respectively driven by said other two components of the planetary gear set for rotation in opposite directions with respect to the coil to provide electrical power generation in the coil upon rotational driving of said one component of the planetary gear set.

* * * * *